(12) United States Patent
Pengg et al.

(10) Patent No.: US 8,276,630 B2
(45) Date of Patent: Oct. 2, 2012

(54) TRACK LINK FOR ANTI-SKID CHAIN

(75) Inventors: Ägyd Pengg, Klagenfurt (AT); Karl Schmid, Brückl (AT)

(73) Assignee: Pewag Schneeketten GmbH & Co KG, Bruckl (AT)

( * ) Notice: Subject to any disclaimer, the term of this patent is extended or adjusted under 35 U.S.C. 154(b) by 137 days.

(21) Appl. No.: 12/571,728

(22) Filed: Oct. 1, 2009

(65) Prior Publication Data

US 2010/0078108 A1 Apr. 1, 2010

(30) Foreign Application Priority Data

Oct. 1, 2008 (AT) .................................. 1529/2008
Jun. 3, 2009 (AT) .................................. 857/2009

(51) Int. Cl.
*B60C 27/08* (2006.01)

(52) U.S. Cl. ........................................ 152/243; 152/231

(58) Field of Classification Search .................. 152/231, 152/240, 243, 244, 245; D12/608; 59/78, 59/82, 84
See application file for complete search history.

(56) References Cited

U.S. PATENT DOCUMENTS

| | | | | | |
|---|---|---|---|---|---|
| 1,882,999 | A | * | 10/1932 | Senft | 152/245 |
| 1,883,000 | A | * | 10/1932 | Senft | 152/245 |
| 1,972,297 | A | * | 9/1934 | Hall | 59/35.1 |
| 2,180,097 | A | * | 11/1939 | Reyburn | 152/245 |
| 2,184,127 | A | * | 12/1939 | Reyburn | 59/35.1 |
| 2,223,942 | A | * | 12/1940 | McKinnon | 59/35.1 |
| 2,280,717 | A | * | 4/1942 | Reyburn | 152/243 |
| 3,282,318 | A | * | 11/1966 | Nylund | 152/243 |
| 3,709,275 | A | * | 1/1973 | Muller | 152/243 |
| 3,752,205 | A | * | 8/1973 | Gower | 152/243 |
| 3,768,534 | A | * | 10/1973 | Gower | 152/239 |
| 3,892,268 | A | * | 7/1975 | Asbeck | 152/172 |
| RE28,898 | E | * | 7/1976 | Gower | 152/239 |
| 4,361,178 | A | * | 11/1982 | Gower | 152/172 |
| 4,403,639 | A | * | 9/1983 | Holte | 152/245 |
| 5,058,645 | A | * | 10/1991 | Muller | 152/244 |
| 5,072,763 | A | * | 12/1991 | Muller et al. | 152/243 |
| 5,423,365 | A | | 6/1995 | Labonville | |
| 6,039,100 | A | * | 3/2000 | Muller | 152/243 |
| D554,578 | S | * | 11/2007 | Roed | D12/608 |
| 7,299,842 | B2 | * | 11/2007 | Rieger et al. | 152/243 |
| D559,173 | S | * | 1/2008 | Roed | D12/608 |

FOREIGN PATENT DOCUMENTS

| | | |
|---|---|---|
| AT | 006 031 U1 | 3/2003 |
| DE | 1008996 | 10/1957 |
| DE | 2533837 C2 | 7/1975 |
| EP | 445901 A2 * | 9/1991 |
| WO | WO 2006/135249 | 12/2006 |

* cited by examiner

*Primary Examiner* — Kip T Kotter
(74) *Attorney, Agent, or Firm* — Design IP

(57) ABSTRACT

The invention relates to a chain link for an anti-skid chain for vehicle tires, whereby protruding studs arranged on the chain link, and at least one stud is arranged on the lengthwise side of the chain link and the longitudinal central axis of the stud is inclined with respect to the central plane of the chain link. The chain link is thus implemented as either a drawn, milled or forged chain link. The invention further relates to an anti-skid chain that exhibits chain links according to the invention.

17 Claims, 4 Drawing Sheets

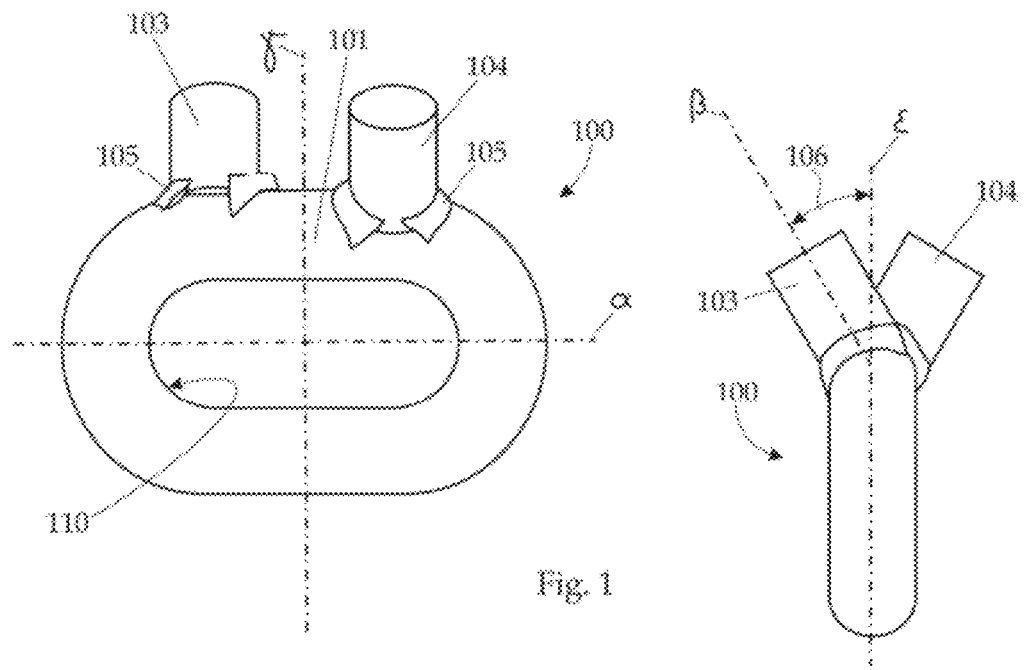
Fig. 1
Fig. 2
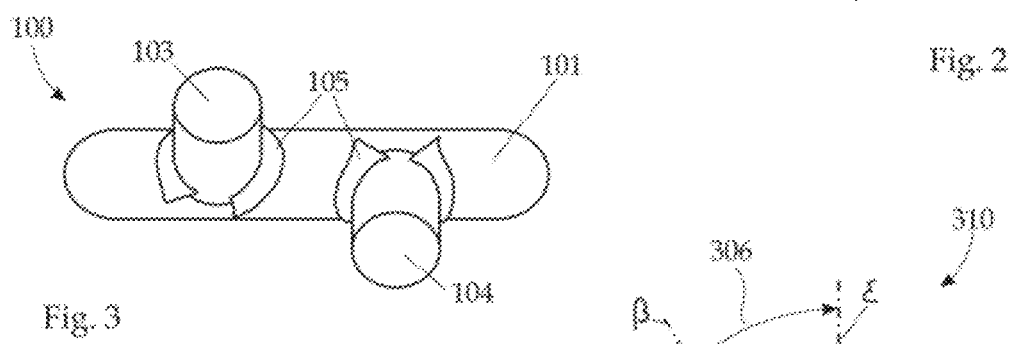
Fig. 3
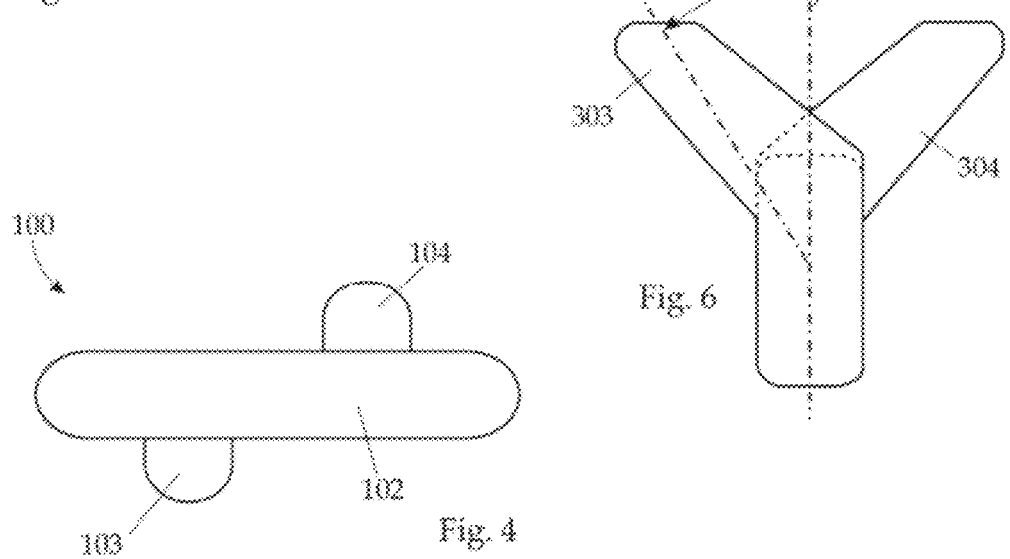
Fig. 4
Fig. 6

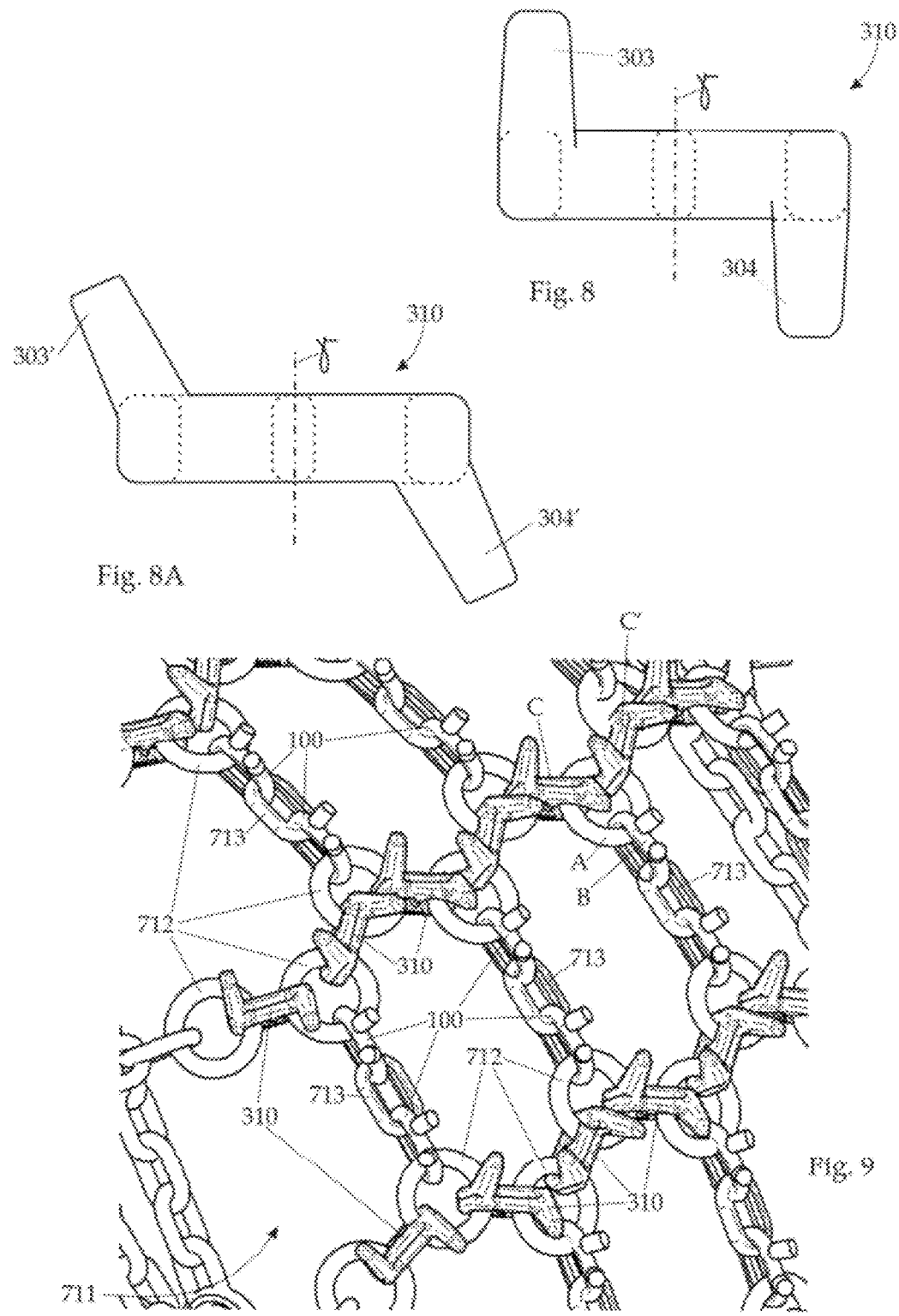

TRACK LINK FOR ANTI-SKID CHAIN

CROSS-REFERENCE TO RELATED APPLICATION

The present application claims priority from Austrian Patent Application Serial No. A 1529/2008, filed on Oct. 1, 2008 and Austrian Patent Application Serial No. A 857/2009, filed on Jun. 3, 2009, both of which are incorporated herein as if fully set forth.

FIELD OF THE INVENTION

The present invention relates to a chain link for an anti-skid chain for vehicle tires, whereby protruding studs are arranged on the chain link. The present invention further relates to an anti-skid chain for vehicle tires with a chain mesh that has chain element configurations whereby the chain element configurations are constituted from alternating oblong vertical links and horizontal links that engage in the openings thereof, and whereby are oriented vertically and horizontally with respect to the wheel tread of the tire.

BACKGROUND OF THE INVENTION

Anti-skid chains with chain links that exhibit protruding studs are standard equipment at the present time, especially for heavy vehicles such as trucks, tractors and forestry machinery. Such chains have proven useful, particularly under difficult circumstances such as snow, ice and swampy ground.

For example, U.S. Pat. No. 5,423,365 describes an anti-skid chain for use in soft and frozen ground. The anti-skid chain includes a pair of side chains oriented in parallel, linked through a system of traction rings and chain networks constituted from an arrangement of vertical and horizontal chain links arranged therein between. Rectangular projections are arranged on the traction rings for contact with soft ground, while radially projecting studs with a round cross-section are arranged on the vertical chain links that serve for traction on frozen soil.

The patent WO 2006/135249 A1 discloses a tire chain for improved grip, especially under snowy and icy pavement conditions. The chain is constituted from a series of chain links—either alternating upright and flat-lying links or rotated links—on which are mounted protruding studs that preferably have an angular or polygonal cross-section.

The applicant's patent AT 006 031 U1 presented an anti-skid chain with ring elements, to each of which was welded a radially protruding prong to improve the road grip.

The primary disadvantage of the known solutions is that in the presence of stress-related twisting of the anti-skid chain, the arrangement of studs on the chain link can no longer ensure proper functioning.

BRIEF SUMMARY OF THE PRESENT INVENTION

The present invention provides a device whereby proper traction is ensured even in the presence of strong stresses and twisting of the anti-skid chain. This is achieved with a chain link of the above-named kind according to the present invention, on which at least one stud is arranged on one lengthwise side of the chain link and a longitudinal central axis of the stud is inclined with respect to the central plane of the chain link. The minimum of one stud points outward, and is thus arranged on the outer side of the chain link.

As a result of the present invention, the studs on the chain remain in contact with the ground even in the presence of strong stresses on the chain that twist the chain. Such twisting can occur quite readily during forest work or generally in impassable terrain, whereby good traction is quite an essential requirement in such situations. In principle, the chain links can be constituted as either flat-lying (or horizontal) or upright (or vertical) chain links, whereby these designations are in relation to the wheel tread of the tire on which the anti-skid chain is mounted. The stud(s) is/are preferably at a minimum arranged on an upright (or vertical) chain link, since these are most often in contact with the ground. The chain link generally has a substantially oval shape. In this case the lengthwise side is parallel to the main axis of the chain oval, whereby the longitudinal axis of the chain link also runs along this main axis. The cross-section of the stud can be cruciform, for example, but it can also be formed otherwise.

The central plane of the chain link is understood here to mean any plane that runs through the lengthwise side and the longitudinal central axis of the chain link. A plane that lies normal to the longitudinal central axis will be designated as a "normal plane" in the further embodiments. Here, the inclination of the studs with respect to the central plane of the chain link means that an end of the stud that is oriented to protrude from the chain link is located outside the central plane, while the end that is facing the chain link (that also represents the connection with the chain link) is located in the central plane. The cross-section of the stud can be cruciform or square, for example, but it can also be formed otherwise.

The longitudinal central axis of the stud is advantageously inclined at an angle of 30°±10° with respect to the central plane of the chain link. On the one hand, this ensures that the chain in the untwisted state will find good traction through the studs. On the other hand, through this arrangement the studs grip the ground optimally even when the chain is twisted through stress. In principle, the studs can incline in two directions from the central plane. The angle is thus correspondingly specified by the absolute angle between the longitudinal central axis of the stud and the central plane of the chain link. In principle, the angle range extends from 5° to 85°.

Each chain link may be provided with two studs that are arranged beside one another along the lengthwise side of the chain link. Still better functioning of the chain link is ensured thereby. In principle, even more studs could be provided, but the advantages of a higher number of studs would need to be weighed against the more laborious manufacture. In a preferred embodiment of the present invention, the studs are inclined in different directions with respect to the central plane of the chain link. Thus, in a hypothetical cross-sectional view of the chain link, this means that one of the studs will be inclined clockwise and one counter-clockwise from the central plane of the chain link. The corresponding angles are thus understood to have the same absolute value in opposite directions. This arrangement ensures optimal traction during any arbitrary twisting of the chain.

In the variants of the present invention described up to this point, the studs are inclined only with respect to the central plane of the chain link. In another embodiment of the present invention, the studs can moreover be inclined with respect to a plane that is oriented to be normal to the longitudinal central axis of the chain link. This plane was introduced above as a normal plane. This means that not only are the studs or the longitudinal central axes of the studs inclined with respect to the central plane of the chain link, but furthermore that the stud central axes are rotated about their origin. Regarding the origin, it is understood here that the studs are connected to the chain link or that the chain link cuts across the stud longitudinal axes. This enables better traction to be achieved with an arbitrary twist of the chain.

In an exemplary variant of the present invention, the chain link is a straight chain link. A straight chain link is understood here to mean a chain link for which the lengthwise sides and the longitudinal central axis lie in a plane. The studs are advantageously affixed to the chain link by welded connections.

Another variant of the present invention relates to a chain link that is a forged part. Forged parts have a thickened structure as a result of the manufacturing process, and have better mechanical properties in comparison with milled or drawn chain links. The result of this is that materials of higher value can be used during forging than in chain links that are welded. Moreover, there is an option for the individual design of forged parts that, in contrast with welding, offers additional possible embodiments within the scope of forging technology. The inclined prongs in the direction of traction grip the ground ideally and provide optimal traction and thus safety.

The chain link and studs are thus manufactured advantageously as one piece. Production costs can be markedly reduced through manufacturing as forged parts. Thus, in a main body, the chain link exhibits at least one hole to admit additional chain links for the use of the chain link in a chain linkage.

The above-named aim is thus furthermore achieved with an anti-skid chain according to the present invention as initially mentioned wherein the above-described chain links are used as vertical links. The chain element configurations are thus formed substantially as polygon shapes.

BRIEF DESCRIPTION OF THE DRAWINGS

In the following, the present invention is described in further detail with a non-limiting embodiment that is depicted in the figures. This is shown schematically in:

FIG. 1, a view of a straight chain link according to the present invention from a direction normal to the central plane of the chain link;

FIG. 2, a view of the chain link from FIG. 1 from a direction along its longitudinal central axis;

FIG. 3, a view of the chain link from a direction normal to the longitudinal central axis, from above with respect to the orientation in FIG. 1;

FIG. 4, a view of the chain link from a direction as in FIG. 3, but from below;

FIG. 6, a side view of the chain link from FIG. 5 along the longitudinal axis of the chain link;

FIG. 8, a horizontal section of the chain link from FIG. 5;

FIG. 8A, a horizontal section of an alternate embodiment of a chain link;

FIG. 9, view of a section of an anti-slip chain with various embodiments of the chain links according to the present invention.

DETAILED DESCRIPTION OF THE PRESENT INVENTION

Figure 5:
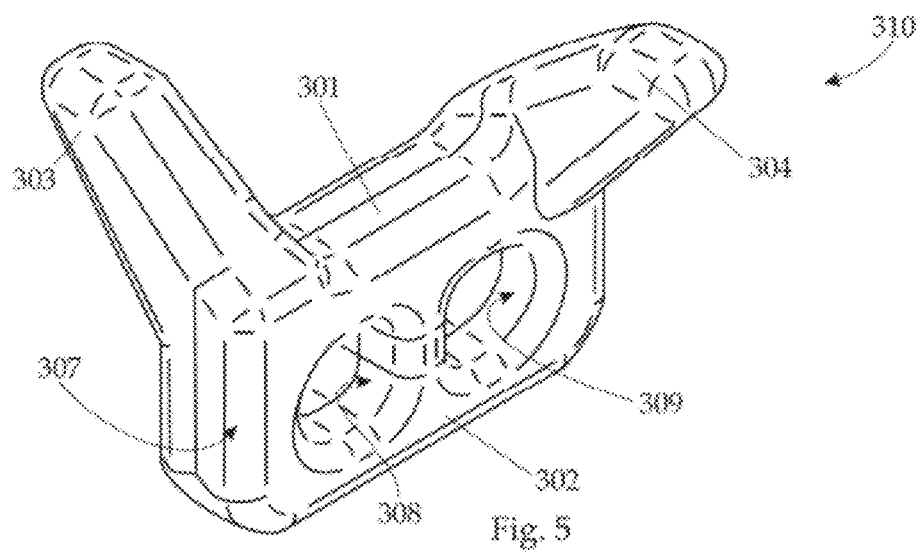
FIG. 5, a perspective view of a chain link according to the present invention that is implemented as a forged part.

FIG. 1 shows an embodiment of the present invention with straight (e.g., milled or drawn) chain link 100 for a more detailed explanation of the advantageous properties. FIG. 1 thus shows a view from a direction normal to central plane $\epsilon$ (see FIG. 2) of straight chain link 100, which is in the plane of the page in the present diagram. Straight chain link 100 is oval in shape and exhibits upper lengthwise side 101 and lower lengthwise side 102 (see FIG. 4), whereby the designations "upper" and "lower" are selected arbitrarily and refer to the representation in FIG. 1. Longitudinal central axis a runs parallel to lengthwise sides 101, 102. Normal plane $\gamma$ lies normal to longitudinal central axis $\alpha$ and the central plane $\epsilon$. Naturally, straight chain link 100 is not used singly, rather it is preferably used together with other chain links, traction rings or forged parts in an anti-skid chain (see FIG. 9)—the depiction thus only serves to provide better understanding.

Two studs 103, 104 with a cruciform cross-section are welded onto upper lengthwise side 101 of straight chain link 100, as can be recognized with depicted weld seams 105. In principle, another number of studs 103, 104 is possible, for example only one stud could be provided, and possibly three or more studs could be welded on. In addition, the stud cross-section can be implemented differently than cruciform, for example with three, four or more corners. The purpose of studs 103, 104 is to grip the ground and thus to provide better grip or traction in the operation of a vehicle that has been equipped with an anti-skid chain with the chain links according to the present invention.

It can be recognized from FIG. 2, which shows a view of straight chain link 100 along the longitudinal central axis $\alpha$, that the longitudinal axes $\beta$ of studs 103, 104 (indicated in FIG. 2 only for first stud 103) are inclined with respect to central plane $\epsilon$ of straight chain link 100. This has the advantage that the grip of the chain links is ensured even if the anti-skid chain is twisted due to stress during operation and the conditions of its contact with the ground are altered.

For example, longitudinal axes 13 (longitudinal central axes of the studs) of studs 103, 104 in the present case are inclined at angle 106 of approximately 30° with respect to the central plane $\epsilon$ of straight chain link 100, whereby in principle the inclination can lie in the range of from 5° to 85°.

However, studs 103, 104 are here inclined in another respective direction from the central plane $\epsilon$ (or, in directions to different sides of central plane $\epsilon$); expressed simply, first stud 103 is inclined in a counter-clockwise direction while second stud 104 is inclined in a clockwise direction. This has the advantage that the chain links will still function even though the anti-skid chain can twist in arbitrary directions. Naturally, all of studs 103, 104 could incline in one direction on one side, or the orientations could be combined arbitrarily in some other manner.

FIG. 3 shows a view from above of upper lengthwise side 101 of chain link 100 (again with respect to the arrangement in FIG. 1) in a direction that lies in central plane $\epsilon$ of chain link 100. It can be recognized here that studs 103, 104 have a cruciform cross-section; in principle, other cross-section shapes are also possible. FIG. 4 shows a view of chain link 100 from below.

FIG. 5 shows a perspective view of another embodiment of the present invention with an individual (forged) chain link 310 that is implemented as a forged part. Naturally, this forged chain link 310 would be used as part of a chain together with other potentially differently-shaped chain links. However, forged chain link 310 is depicted individually, again for better understanding.

Forged parts have better mechanical characteristics than milled or drawn chain links, since they exhibit a thickened structure as a result of the manufacturing process. Individual design is a permissible option with forged parts that, in contrast with welding, offers additional possible embodiments within the scope of forging technology.

Forged chain link 310 is constituted from forged main body 307, in which two holes 308, 309 are implemented to admit additional chain links. In principle, it is possible here to make a single through-passage, similarly to the internal opening (see 110 in FIG. 1) in the straight chain link from FIGS. 1 and 2. Main body 307 is implemented substantially as a rectangle, whereby it exhibits two lengthwise sides 301, 302 and two breadthwise sides, whereby the breadthwise sides are characterized by being implemented as shorter than lengthwise sides 301, 302. The lengthwise sides are constituted as an "upper" lengthwise side 301 and a "lower" lengthwise side 302, whereby these designations are again arbitrary and established from the representation in FIG. 5.

Main body 307 of forged chain link 310 exhibits (as in straight chain link 100 in FIGS. 1 and 2) a central plane $\epsilon$, which runs parallel to lengthwise sides 301, 302 of main body 307 along longitudinal central axis $\alpha$ (see FIG. 7) of forged chain link 310 (for purposes of clarity, central plane $\epsilon$ and longitudinal central axis $\alpha$ are not indicated in FIG. 5).

Two studs 303, 304 are implemented on upper lengthwise side 301, which are forged together as one piece with main body 307 of forged chain link 310. For technical manufacturing reasons, studs 303, 304 in the present embodiment are implemented with a square cross-section such that they are increasingly tapered in the direction away from main body 307. Both the tapering and the square cross-section are only variants on different possibilities of implementing the studs.

Studs 303, 304 are respectively inclined outward from central plane $\epsilon$ of forged chain link 310. Studs 303, 304 are thus inclined outward in different respective directions from central plane $\epsilon$. Naturally, the embodiment in FIG. 5 is only one of many embodiments. For example, it would be conceivable for studs 303, 304 both to be oriented outward in the same direction from central plane $\epsilon$. As was already mentioned in the discussion of the embodiment from FIGS. 1 and 2, it would also be theoretically possible for fewer or more than two studs to be provided.

FIG. 6 shows a side view of the forged chain link 310 from FIG. 5. The representation here takes place in the direction of longitudinal central axis $\alpha$ or central plane $\epsilon$, which is indicated in FIG. 6 as a dot-dash line. It is clearly recognizable that studs 303, 304 are inclined with respect to central plane $\epsilon$ of forged chain link 310. Angle 306 between stud longitudinal axes $\beta$ (as in FIG. 2, only one stud longitudinal axis $\beta$ is indicated, for better understanding) and central plane $\epsilon$ lies respectively between 5° to 85°, whereby the angle is preferably 30°±10°.

In the advantageous embodiment, studs 303, 304 together enclose an angle of up to 80°. For the sake of completeness it should be mentioned that due to studs 303, 304 being tapered in the upward direction (here "up" means in relation to the depiction in FIG. 6), the corresponding angle is measured between stud longitudinal axis $\beta$ (which is not parallel to the external boundaries of the studs) and central plane $\epsilon$.

Figure 7:
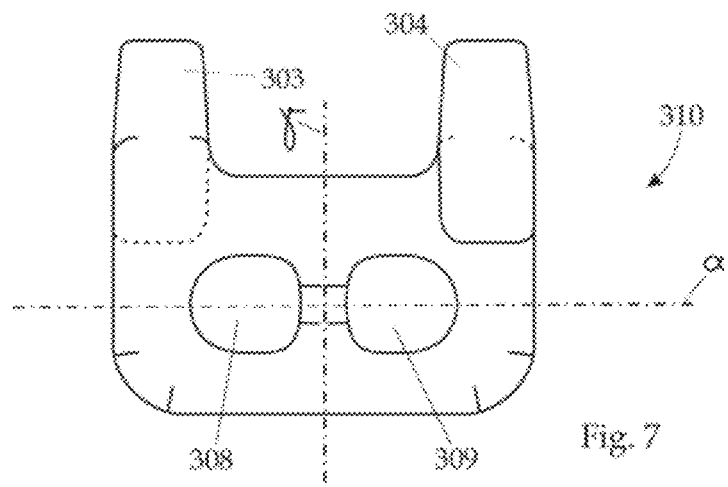
FIG. 7, a front view of the chain link from FIG. 5 a direction normal to the longitudinal axis.

In FIG. 7 is a front view of the forged chain link 310 from FIG. 5 depicted in a direction normal to central plane $\epsilon$ (see FIG. 6), which lies in the plane of the page for the figure in question. Longitudinal central axis $\alpha$ is depicted to illustrate this aspect. Normal plane $\gamma$ runs normal to longitudinal central axis $\alpha$.

Two holes 308, 309 to admit adjacent chain links in a chain linkage are clearly recognizable. It is mentioned once again that the two holes 308, 309 can also be combined into a single continuous hole. It is furthermore apparent from FIG. 7 that studs 303, 304 in the present embodiment are manufactured such that they do not protrude over the breadthwise sides of forged chain link 310. This is also recognizable from FIG. 8, which depicts a horizontal section of forged chain link 310, whereby here too studs 303, 304 do not reach over the breadthwise sides of forged chain link 310.

Figure 7A:
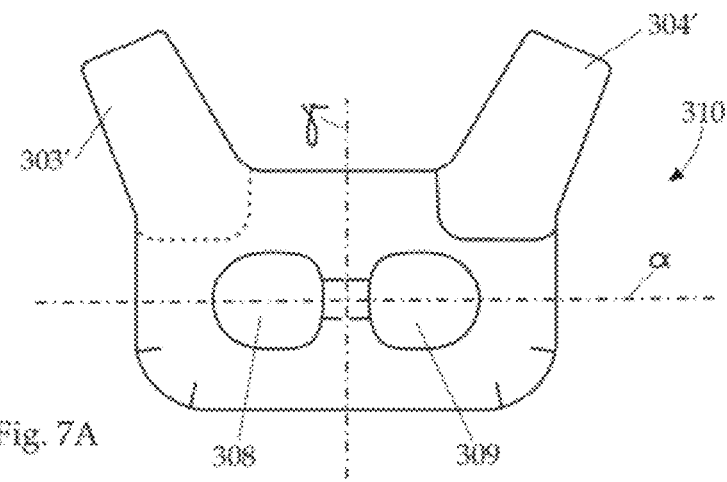
FIG. 7A, a front view of an alternate embodiment of a chain link in a direction normal to the longitudinal axis of the chain link.

Naturally, the studs can also be manufactured so that they protrude over the breadthwise sides of chain link 310, or incline from the normal plane $\gamma$ of the chain link in addition to the inclination with respect to the central plane. Thus, this means that the studs (or the longitudinal central axes of the studs) are rotated about the point of attachment to the chain link in addition to their inclination with respect to the central plane. The rotation will generally lie between 0° and 90°. Such a variant is shown in the embodiment of FIGS. 7A and 8A. In this embodiment, studs 303', 304' thus protrude over the breadthwise sides of chain link 310.

Although this variant of the invention is not depicted for the embodiment of FIGS. 1 and 2, naturally studs 103, 104 provided in that case could be arranged in the described manner. For better understanding, normal plane $\gamma$ in FIGS. 1, 7 and 8 is indicated as a dot-dash line.

FIG. 9 shows a view of a section of anti-skid chain 711 that exhibits the chain links according to the present invention. Anti-skid chain 711 thus exhibits essentially polygonal structures that are connected to one another. Although this involves hexagons in the present case, naturally other arbitrary types of embodiment are also possible.

Anti-skid chain 711 is constituted from ring-shaped connection elements 712, which are arranged to lie flat and are connected with upright chain links 100, 310 that have inclined studs that, for their part, further act together with flat-lying chain links 713, and to some extent with already mentioned ring-shaped connection elements 100, 310, 712.

From inspection of a specific ring-shaped connection element 712, designated with A in FIG. 9, it can be recognized that this is connected with additional chain links in a Y-shape. In one direction (along the "trunk" of the Y-shape), ring-shaped connection element A is connected with an upright drawn chain link B (corresponding to chain link 100 from FIGS. 1 and 2) that in turn engages a flat-lying chain link (without studs) 713, which is connected with another ring-shaped connection element via another upright drawn chain link.

Ring-shaped connection element A is connected in two additional directions (the "branches" of the Y-shape) with upright chain links with studs, which are implemented as forged parts. For their part, these forged chain links C, C' (corresponding to chain link 310 from FIGS. 5 through 8) further engage respective ring-shaped connection elements. The anti-skid chain is constituted substantially from a succession of these arrangements.

Figure 10:
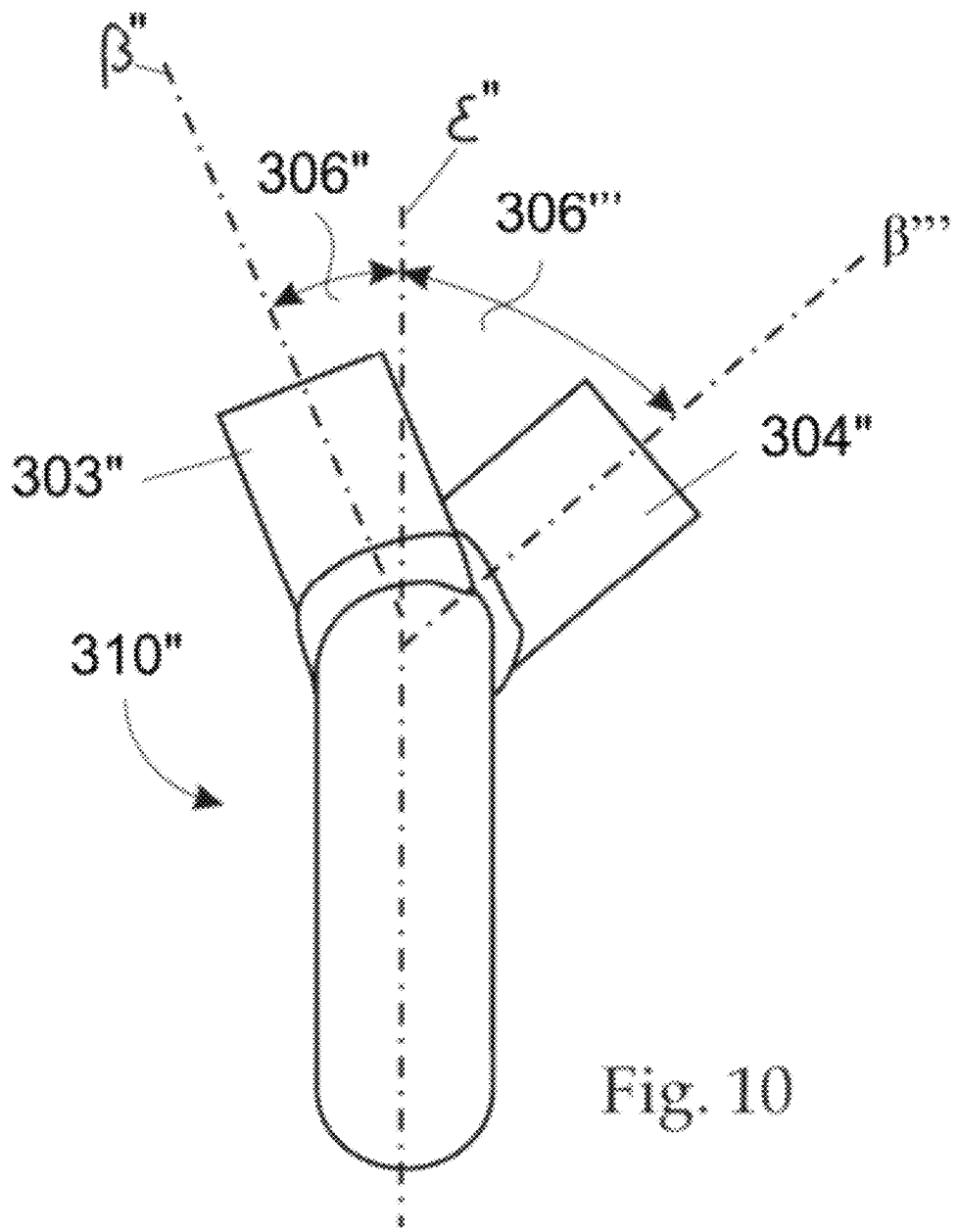
FIG. 10, a side view of an alternate embodiment of a chain link along the longitudinal axis of the chain link.

FIG. 10 shows a side view of an alternate embodiment of a chain link 310", as viewed along the longitudinal axis of the chain link 310". The chain link 310" has a first stud 303" and a second stud 304". In this embodiment, first stud 303" has a longitudinal central axis $\beta"$ which is inclined at a first angle 306" with respect to the central plane $\epsilon"$ of the chain link and the second stud 304" has a longitudinal central axis $\beta'''$ which is arranged at a second angle 306''' with respect to the central plane $\epsilon"$ of the chain link. In this embodiment, the first angle 306" and the second angle 306''' are different. Said another way, in this embodiment the studs 303", 304" are inclined at different angles with respect to the central plane $\epsilon"$ of the chain link 310".

While the principles of the invention have been described above in connection with preferred embodiments, it is to be clearly understood that this description is made only by way of example and not as a limitation of the scope of the invention.

What is claimed is:

1. A chain link for an anti-skid chain for vehicle tires with at least two protruding studs arranged on the chain link, wherein the chain link is a straight chain link and the studs are arranged adjacent to one another on a lengthwise side of the chain link and longitudinal central axes of the studs are inclined at an angle having an absolute value in the range of 20° to 40° with respect to a central plane of the chain link, the central plane of the chain link running through the lengthwise side of the chain link and the longitudinal central axes of the studs.

2. The chain link as recited in claim 1, wherein the longitudinal central axes of the studs are inclined at an angle having an absolute value of 30° with respect to the central plane of the chain link.

3. An anti-skid chain for vehicle tires with a chain mesh that has chain element configurations, whereby the chain element configurations are constituted from alternating oblong upright links that are oriented vertically with respect to the wheel tread of the vehicle tire and flat-lying links that are oriented horizontally with respect to the wheel tread of the vehicle tire, the flat lying links engaging in the recesses of the upright links, wherein chain links corresponding to claim 2 are used as said vertical links.

4. The chain link as recited in claim 2, wherein the longitudinal central axes of the studs are inclined at angles of the same absolute value, but opposite sign, with respect to the central plane of the chain link.

5. The chain link as recited in claim 1, wherein the longitudinal central axes of the studs are inclined at different angles with respect to the central plane of the chain link.

6. An anti-skid chain for vehicle tires with a chain mesh that has chain element configurations, whereby the chain element configurations are constituted from alternating oblong upright links that are oriented vertically with respect to the wheel tread of the vehicle tire and flat-lying links that are oriented horizontally with respect to the wheel tread of the vehicle tire, the flat lying links engaging in the recesses of the upright links, wherein chain links corresponding to claim 5 are used as said vertical links.

7. The chain link as recited in claim 1, wherein the longitudinal central axes of the studs furthermore are inclined with respect to a normal plane, the normal plane being oriented normal to the longitudinal central axis of the chain link.

8. An anti-skid chain for vehicle tires with a chain mesh that has chain element configurations, whereby the chain element configurations are constituted from alternating oblong upright links that are oriented vertically with respect to the wheel tread of the vehicle tire and flat-lying links that are oriented horizontally with respect to the wheel tread of the vehicle tire, the flat lying links engaging in the recesses of the upright links, wherein chain links corresponding to claim 7 are used as said vertical links.

9. The chain link as recited in claim 1, wherein the studs are affixed to the chain link with welded joints.

10. An anti-skid chain for vehicle tires with a chain mesh that has chain element configurations, whereby the chain element configurations are constituted from alternating oblong upright links that are oriented vertically with respect to the wheel tread of the vehicle tire and flat-lying links that are oriented horizontally with respect to the wheel tread of the vehicle tire, the flat lying links engaging in the recesses of the upright links, wherein chain links corresponding to claim 9 are used as said vertical links.

11. The chain link as recited in claim 1, wherein the chain link is manufactured as a forged part.

12. The chain link as recited in claim 11, wherein the chain link and the studs are manufactured as a single piece.

13. The chain link as recited in claim 12, wherein the chain link exhibits at least one hole in a main body to admit additional chain links for use in a chain linkage.

14. The chain link as recited in claim 11, wherein the chain link exhibits at least one hole in a main body to admit additional chain links for use in a chain linkage.

15. An anti-skid chain for vehicle tires with a chain mesh that has chain element configurations, whereby the chain element configurations are constituted from alternating oblong upright links that are oriented vertically with respect to the wheel tread of the vehicle tire and flat-lying links that are oriented horizontally with respect to the wheel tread of the vehicle tire, the flat lying links engaging in the recesses of the upright links, wherein chain links corresponding to claim 11 are used as said vertical links.

16. An anti-skid chain for vehicle tires with a chain mesh that has chain element configurations, whereby the chain element configurations are constituted from alternating oblong upright links that are oriented vertically with respect to the wheel tread of the vehicle tire and flat-lying links that are oriented horizontally with respect to the wheel tread of the vehicle tire, the flat lying links engaging in the recesses of the upright links, wherein chain links corresponding to claim 1 are used as said vertical links.

17. The chain link as recited in claim 1, wherein the longitudinal central axes of the studs are inclined at angles of the same absolute value, but opposite sign, with respect to the central plane of the chain link.

* * * * *